(12) United States Patent
Bandic et al.

(10) Patent No.: US 7,880,990 B2
(45) Date of Patent: Feb. 1, 2011

(54) PATTERNED-MEDIA MAGNETIC RECORDING DISK WITH CRYPTOGRAPHICALLY SCRAMBLED PATTERNS AND DISK DRIVE OPERABLE WITH THE DISK

(75) Inventors: Zvonimir Z. Bandic, San Jose, CA (US); Jorge Campello de Souza, Sunnyvale, CA (US); Cyril Guyot, San Jose, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 224 days.

(21) Appl. No.: 12/332,287

(22) Filed: Dec. 10, 2008

(65) Prior Publication Data
US 2010/0142076 A1    Jun. 10, 2010

(51) Int. Cl.
*G11B 5/09* (2006.01)
(52) U.S. Cl. .......................................... 360/48; 360/51
(58) Field of Classification Search ....................... None
See application file for complete search history.

(56) References Cited

U.S. PATENT DOCUMENTS

| | | | |
|---|---|---|---|
| 4,631,603 A | 12/1986 | Ryan | |
| 6,005,727 A | 12/1999 | Behrens et al. | |
| 6,092,195 A | 7/2000 | Nguyen | |
| 6,604,153 B2 | 8/2003 | Imamura et al. | |
| 6,628,598 B2 | 9/2003 | Edwards et al. | |
| 6,643,082 B1 | 11/2003 | Belser | |
| 6,940,667 B2 | 9/2005 | Kuo et al. | |
| 7,116,892 B2 * | 10/2006 | Wajs | 386/94 |
| 7,164,548 B2 * | 1/2007 | Hattori et al. | 360/48 |
| 7,508,610 B2 * | 3/2009 | Kosugi et al. | 360/49 |
| 2008/0239534 A1 | 10/2008 | Albrecht et al. | |

OTHER PUBLICATIONS

Bandic et al., "Patterned magnetic media: impact of nanoscale patterning on hard disk drives", Solid State Technology S7+ Suppl. S, Sep. 2006.
Terris et al., "Topical Review: Nanofabricated and self-assembled magnetic structures as data storage media", J. Phys. D: Appl. Phys. 38 (2005) R199-R222.

\* cited by examiner

*Primary Examiner*—Daniell L Negrón
(74) *Attorney, Agent, or Firm*—Thomas R. Berthold

(57) ABSTRACT

Patterned-media magnetic recording disks are made from a master template that has nondata regions that contain a pattern of one or more discrete nondata islands and discrete gaps, with the pattern representing a scrambled number. All disks made from the master template, or from replica molds made from the master, will have the same patterns. When the disks are DC-magnetized so that all the nondata islands are magnetized in the same direction, these patterns will include one or more of discrete magnetized nondata islands and discrete nonmagnetic gaps that are scrambled in a pseudo-random manner. During operation of the disk drive the patterns are detected by the read head and interpreted within the disk drive using knowledge of the pseudo-random scrambling function, so that reading and writing of data can occur in the conventional manner. If the disks are copied in an attempt to replicate the master template, the resulting disks will be inoperable in a disk drive because of the scrambling.

6 Claims, 9 Drawing Sheets

PATTERNED-MEDIA MAGNETIC RECORDING DISK WITH CRYPTOGRAPHICALLY SCRAMBLED PATTERNS AND DISK DRIVE OPERABLE WITH THE DISK

BACKGROUND OF THE INVENTION

1. Field of the Invention

This invention relates generally to patterned-media magnetic recording disks, wherein each data bit is stored in a magnetically isolated data island on the disk, and more particularly to patterned-media disks with scrambled patterns for preventing replication of the disk master used to make the disks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a template or mold, sometimes also called a "stamper", that has a topographic surface pattern. In this method the magnetic recording disk substrate with a polymer film on its surface is pressed against the mold. The polymer film receives the reverse image of the mold pattern and then becomes a mask for subsequent etching of the disk substrate to form the pillars on the disk. The magnetic layer and other layers needed for the magnetic recording disk are then deposited onto the etched disk substrate and the tops of the pillars to form the patterned-media disk. The mold may be a master mold for directly imprinting the disks. However, the more likely approach is to fabricate a master mold with a pattern of pillars corresponding to the pattern of pillars desired for the disks and to use this master mold to fabricate replica molds. The replica molds will thus have a pattern of holes corresponding to the pattern of pillars on the master mold. The replica molds are then used to directly imprint the disks. Nanoimprinting of patterned media is described by Bandic et al., "Patterned magnetic media: impact of nanoscale patterning on hard disk drives", *Solid State Technology* S7+ *Suppl. S*, September 2006; and by Terris et al., "TOPICAL REVIEW: Nanofabricated and self-assembled magnetic structures as data storage media", *J. Phys. D: Appl. Phys.* 38 (2005) R199-R222.

The master template or mold requires extensive time and effort to design. Additionally, it is fabricated by an expensive and time-consuming process using expensive equipment, for example by electron beam (e-beam) lithography. The master template (or replica molds made from the master template) is used for making millions of disks, each of which is an exact replica of the expensive master. It is possible that the master template or replica molds may be stolen, which would enable a potential competitor or media maker to create a new master with little investment in time or cost. Also, the master template or replica molds may be copied from a disk.

What is needed are patterned-media disks that if copied would not be operable in a disk drive.

SUMMARY OF THE INVENTION

This invention relates to patterned-media disks made from a master template. The master template contains a pattern that is scrambled in a pseudo-random manner such that it cannot be used without exact knowledge of the scrambling. The scrambling function is derived from a secret key and is generated using standard cryptographic techniques. All disks made from the master template, or from replica molds made from the master, will have the same scrambled patterns. An authorized user will be able to calculate the perturbations in the scrambled patterns using the secret key, correct for them, and then use a disk in the conventional manner. An unauthorized user will not be able to use a disk or will only be able to use a disk in a degraded or limited manner without knowledge of the secret key.

In one embodiment the track identification (TID) numbers are scrambled into pseudo-random numbers, for example by the use of a block cipher and secret key, and the scrambled TIDs are patterned onto the master template. The TIDs are permuted by the block cipher. When the disks made from the master template are used in the disk drive the head reads the permuted TIDs and the disk drive performs the inverse permutation, for example by applying the inverse block cipher, yielding the actual TIDs. Reading and writing can then occur in the conventional manner. In another embodiment the master template is patterned so that the physical spacings of the data sectors from their data synchronization marks are scrambled, resulting in pseudo-random phase shifts, with the data sectors in the different tracks having different phase shifts. The pseudo-random phase shifts may be calculated from the TIDs using a scrambling function, such as a keyed hash function that uses a secret key to generate pseudo-random numbers. During manufacturing the scrambling function outputs pseudo-random numbers representing the phase shifts for the data sectors in the tracks, which are then used to fabricate the master template. When the disks made from the master template are used in the disk drive the same scrambling function takes the TID as input to determine the phase shift for data sectors in the selected track where data is to be read or written.

DETAILED DESCRIPTION OF THE INVENTION

Figure 1:
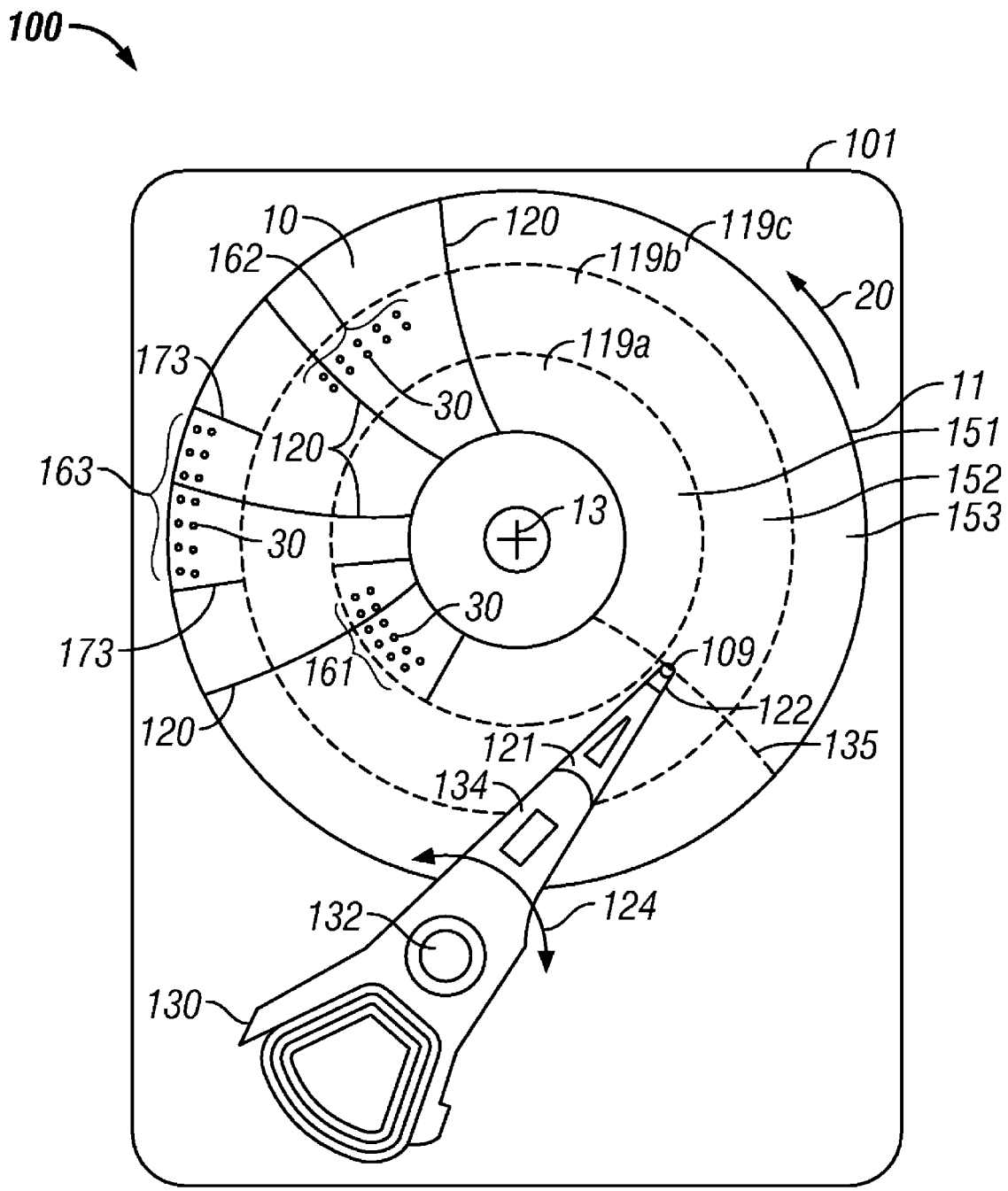
FIG. 1 is a top view of a patterned-media disk drive like that to which the present invention relates.

FIG. 1 is a top view of a patterned-media disk drive 100 like that to which the present invention relates. The drive 100 has a housing or base 101 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 (also called a read/write head) is typically a combination of an inductive write head 109b (shown in FIG. 3) with a magnetoresistive read head 109a (shown in FIG. 3) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 11 and discrete data blocks or islands 30 of magnetizable material on the substrate 11. The data islands 30 function as discrete magnetic bits for the storage of data. Each discrete data island 30 is a magnetized island separated from other islands by nonmagnetic spaces. The term "nonmagnetic" means that the spaces between the data islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces between the data islands may also be the absence of magnetic material, such as grooves or troughs in the magnetic recording layer or disk substrate.

The data islands 30 are arranged in radially-spaced circular tracks, with the tracks being grouped into annular bands or zones 151, 152, 153. Within each track, the data islands 30 are typically arranged in fixed-byte-length data sectors (e.g., 512 bytes or 4096 bytes plus additional bytes for error correction coding (ECC) and data sector header). The number of data sectors is different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also generally radially-directed synchronization (sync) marks, like typical marks 173 in zone 153. Each sync mark 173 may be plurality of circumferentially-spaced marks, with the spacing being different in each zone, that are detected by the read head to enable the write head to be synchronized with the specific spacing of the data islands in that zone. The sync marks may be located in the sector headers for the data sectors. The physical location where data is to be written or read (sometimes called the physical block address or PBA) is identified by a track number (also called "cylinder" number when there are multiple disks), a head number (which identifies the disk surface when there are multiple disks in the disk drive), and a data sector number. This address is sometimes referred to as the cylinder-head-sector or CHS address.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced servo sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
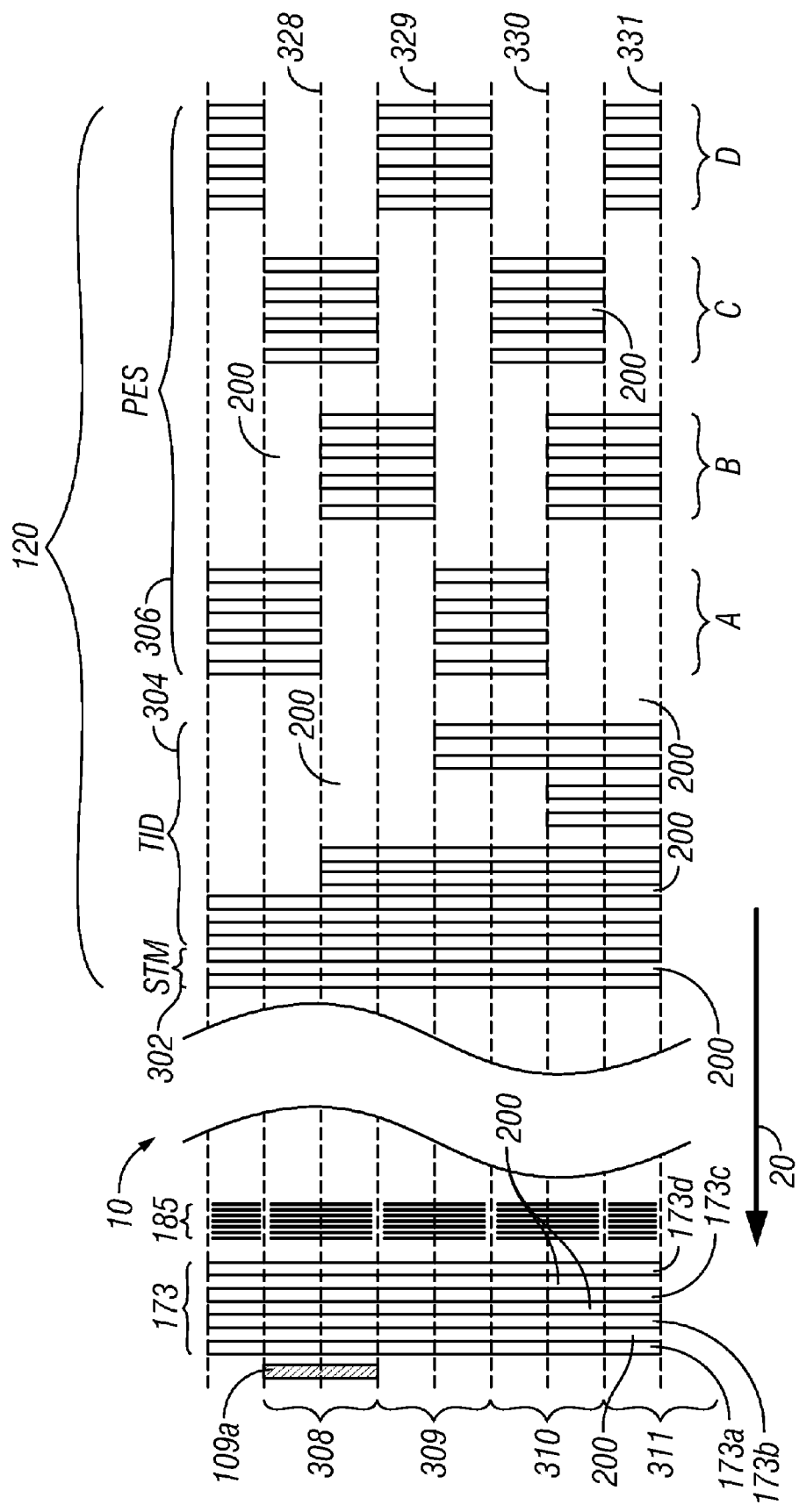
FIG. 2 is a schematic showing a portion of a patterned-media magnetic recording disk as proposed in the prior art.

FIG. 2 is a schematic showing a portion of patterned-media disk 10 with a patterned sync mark 173 and a patterned servo sector 120 spanning several data tracks, as proposed in the prior art. Four data tracks are depicted: 308, 309, 310 and half-track 311, each having a respective track centerline 328, 329, 330 and 331. The read head 109a is shown as positioned in data track 308 and will detect the sync mark 173 and read the data islands in the data sector 185 following sync mark 173 as the disk rotates in the direction of arrow 20. The sync mark 173 is depicted with four sync marks as magnetized nondata islands 173a-173d separated by nonmagnetic spaces 200. The sync marks 173a-173d are represented as stripes that extend across the data tracks in the radial direction, resulting in a single-frequency pattern suitable for locking a phase-locked-loop data clock prior to reading or writing data bits in the data sectors. The sync mark 173 precedes the data sector 185, which shows several data islands, represented as solid lines.

The servo sector 120 is a conventional servo pattern of the type commonly used in sector servo systems and shows a greatly simplified pattern for clarity. The servo pattern includes several fields containing nondata islands, three of which are shown as servo-timing-mark (STM) field 302, track identification (TID) field 304 and position-error-signal (PES) field 305 depicted as the well-known quadrature pattern of PES islands A-D. The PES islands A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are detected by read head 109a and used to reposition the head.

In FIG. 2 all of the islands in sync mark 173 and servo sector 120 are discrete islands of magnetic material and are magnetized in the same direction, either perpendicular to the recording layer (either into or out of the paper in FIG. 2) for perpendicular-recording media, or in the plane of the recording layer (either to the right or left in the along-the-track direction in FIG. 2) for horizontal-recording media. The islands are typically DC-magnetized by a large magnet during manufacturing. Each discrete island is a magnetized island separated from other islands by nonmagnetic spaces represented as 200. The term "nonmagnetic" means that the spaces 200 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

As shown schematically in FIG. 2, the nondata islands (sync mark 173 and servo sector 120) have a frequency substantially lower than the data islands (data sector 185), typically 3 to 5 times lower. This is because for a given resolution of the read head 109a, a modern partial-response (PR) read channel in the disk drive can handle linear bit densities with a period several times greater than the resolution of the read head. However, to clearly resolve individual pulses from the nondata island patterns, which is beneficial for data synchronization and PES decoding, the period of the nondata islands in sync marks 173 and servo sector 120 should be close to the resolution of the read head.

Figure 3:
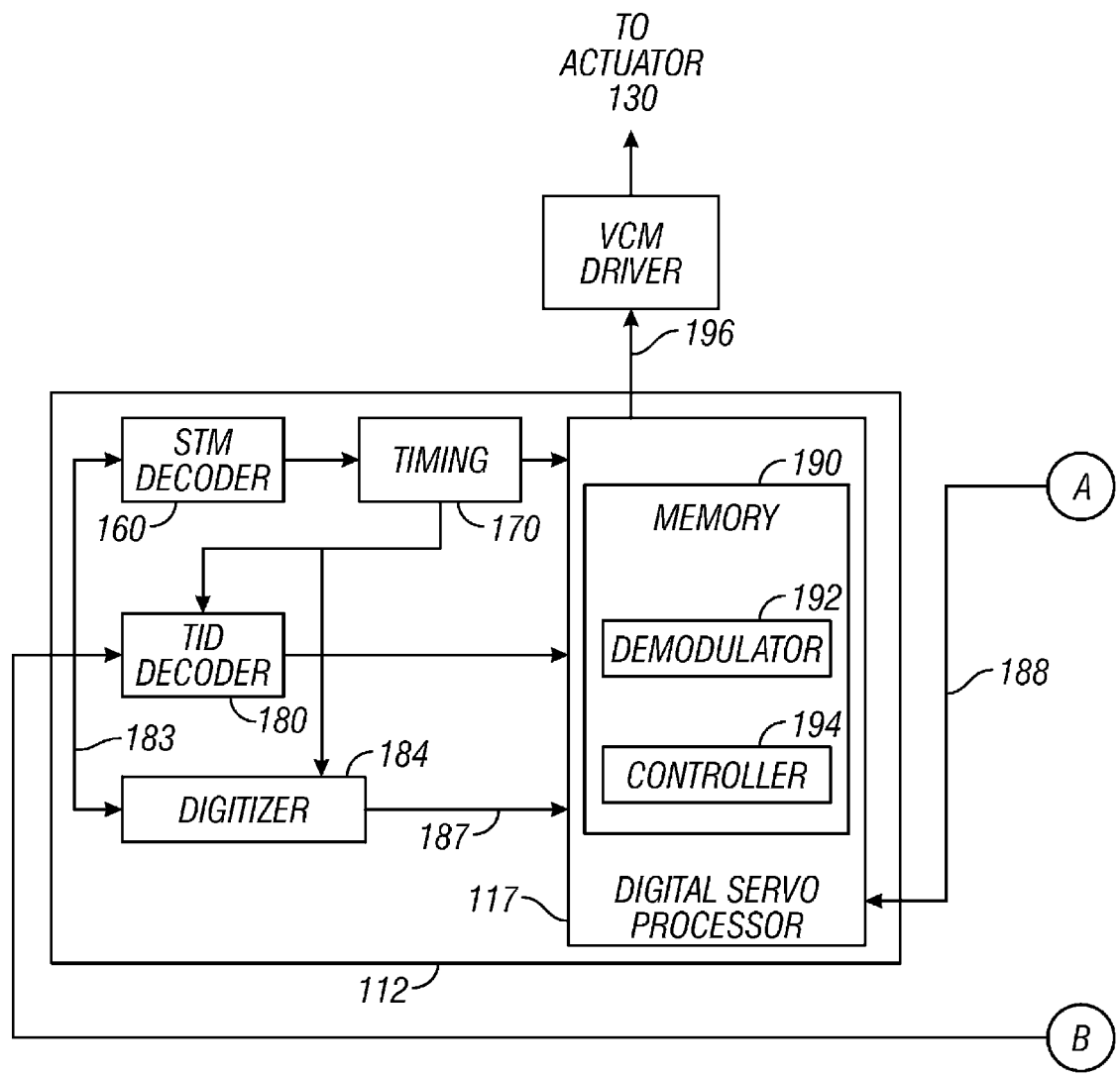
FIG. 3 is a block diagram of the electronics associated with the patterned-media disk drive like that to which the present invention relates and also shows a sectional view of the patterned-media magnetic recording disk.
Figure 3:
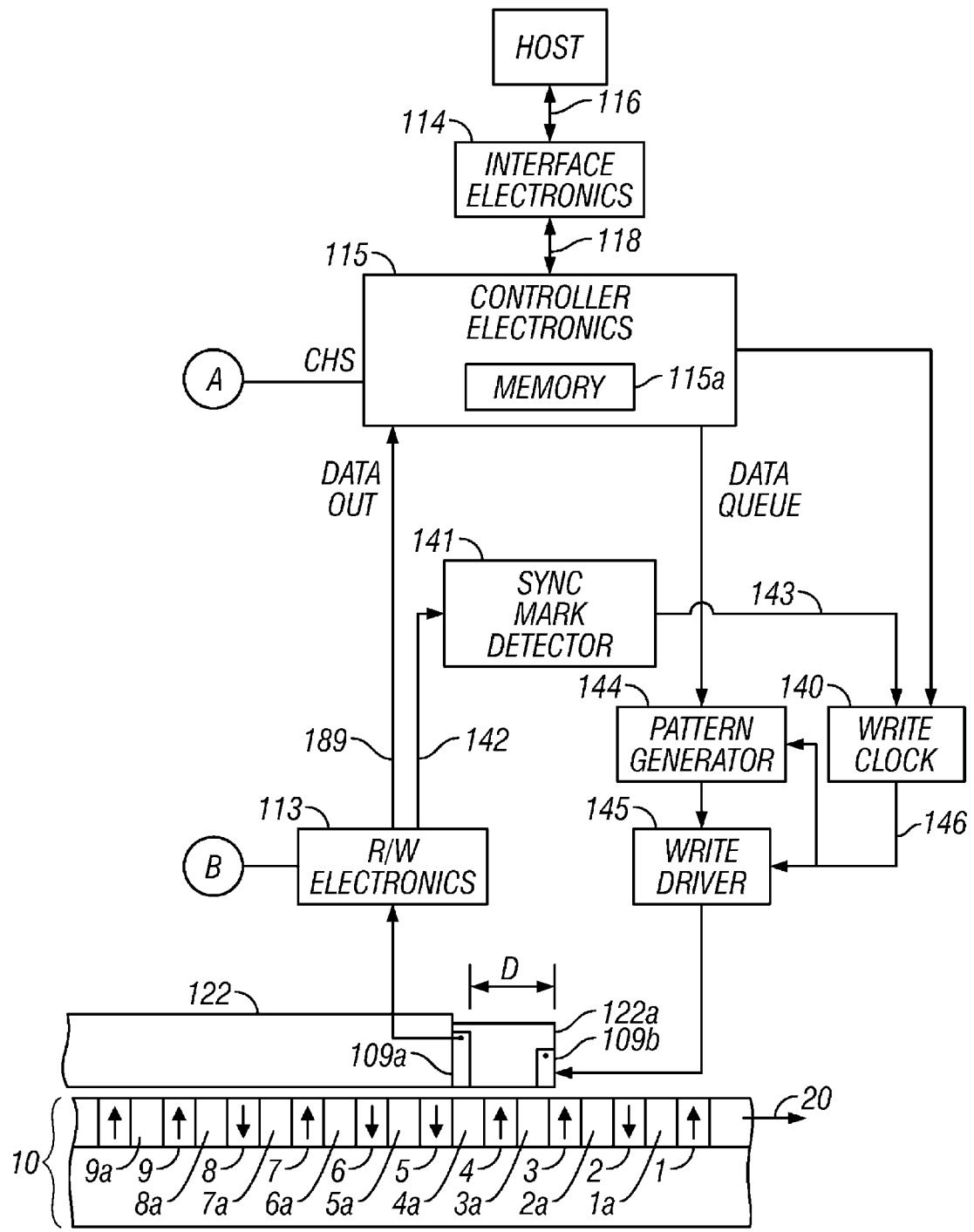

FIG. 3, which is not drawn to scale, is a block diagram of the electronics associated with disk drive and also shows a sectional view of the magnetic recording disk 10 with a magnetic recording layer of patterned media in the form of discrete magnetizable data islands 1-9. FIG. 2 also shows a portion of slider 122 with read/write head 109 that includes the read element or head 109a and the write element or head 109b. The read head 109a and write head 109b are formed on the trailing end 122a of slider 122. The arrows depicted in the islands 1-9 represent the magnetic moments or magnetization directions in the islands, and are depicted for perpendicular or out-of-plane magnetic recording. The recording or writing of data occurs by an inductive coil write head 109b that has a write pole that generates a magnetic field to magnetize the islands in one of the two magnetization directions, depending on the direction of current through the coil of the write head. Because there is no magnetic material in the gaps 1a-9a between the islands 1-9, the write pulses must be precisely timed to magnetize the appropriate islands. While FIG. 3 illustrates perpendicular patterned media, wherein the islands 1-9 are depicted with their moments oriented out of the plane of the recording layer, the invention is fully applicable to horizontal or longitudinal patterned media, wherein the islands 1-9 would have their moments oriented in the plane of the magnetic recording layer.

The disk drive electronics include read/write (R/W) electronics 113, servo electronics 112, data controller electronics 115 and interface electronics 114. The servo positioning information in the servo sectors 120 is detected by the read head 109a, sent to the read/write electronics 113, and input to the servo electronics 112. The read head 109a is controlled by a read clock. The servo electronics 112 includes a digital servo control processor 117. The servo control processor 117 provides a control signal 196 to a VCM driver 198 that controls current to the VCM actuator 130 to position the head 109.

Within the servo electronics 112, the STM decoder 160 detects the STM 302 (FIG. 2) from the clocked data stream. Once an STM has been detected, an STM found signal is generated. The STM found signal is used to adjust timing circuit 170, which controls the operating sequence for the remainder of the servo sector 120. After detection of an STM, the track identification (TID) decoder 180 receives timing information from timing circuit 170, reads the TID, which is typically Gray-code encoded, and then passes the decoded TID information to servo control processor 117. Subsequently, the analog servo signal 183 from the read head 109a as the read head detects the PES pattern of servo blocks is converted to a digital servo signal by digitizer 184 in servo electronics 112 and passed to the servo control processor 117 as a digital servo signal 187.

The servo control processor 117 is typically a programmable controller or microprocessor with associated memory 190. The processor 117 includes a stored demodulator program 192 that calculates a PES from the digitized servo signal 187, and a stored controller program 194 that uses the PES to calculate the actuator control signal 196 sent to VCM driver 198. The controller program 194 recalls from memory a set of parameters based on the static and dynamic characteristics of the "plant" being controlled, i.e., the VCM actuator 130. The controller program 194 is well-known and is essentially a matrix multiplication algorithm, and the controller parameters are coefficients used in the multiplication and stored in the memory 190 of processor 117.

Referring again to FIG. 3, interface electronics 114 communicates with a host system over interface 116, passing data and command information. Interface electronics 114 also communicates with data controller electronics 115 over interface 118. Interface electronics 114 receives a request from the host system, such as a personal computer (PC), for reading from or writing to the data sectors over interface 116. Controller electronics 115 includes a microprocessor and associated memory 115a. Controller electronics 115 receives a list of requested data sectors from interface electronics 114 and converts each data sector request into a CHS number where the data is to be read or written. The CHS numbers are passed to servo electronics 112 via line 188 to enable the actuator 130 to position the read/write head 109 to the appropriate data sector.

FIG. 3 also shows schematically the transfer of data between the host system and the disk drive. The data to be read from the disk 10 is detected by read head 109a as a readback signal from recorded data islands in the data sectors, amplified and decoded by read/write electronics 113, and then sent to controller electronics 115 via line 189. Data controller electronics 115 then sends the data through interface electronics 114 to the host via interface 116. The data to be written to the disk 10 is sent from the host to interface electronics 114 and controller electronics 115 and then as a data queue to pattern generator 144 and then to write driver 145. The write driver 145 generates high-frequency current pulses to the coil of write head 109b which results in the magnetic write fields that magnetize the data islands 1-9. The write clock 140, which is capable of operating at different frequencies corresponding to the different data zones, outputs a clock signal on line 146 to control the timing of pattern generator 144 and write driver 145. When the read head 109a detects a sync mark 173, a signal is sent through read/write electronics 113 to a sync mark detector 141. Sync mark detector 141 then outputs a signal on line 143 to control the timing of write clock 140. The sync mark detector 141 detects the sync marks (like sync marks 173 in FIGS. 1 and 2) from R/W electronics 113. The spacing between sync marks is different in each zone so sync mark detector 141 enables the write clock 140 to be synchronized with the spacing of the data islands in each of the different zones. FIG. 3 also shows a physical spacing D in the circumferential or along-the-track direction between the read head 109a and the write head 109b.

As previously described, patterned-media disks, like disk 10 with the pre-patterned nondata regions including the sync marks 173 and the servo sectors 120 (FIG. 2), are fabricated from a master template or mold. The nondata islands in the sync marks 173 and servo sectors 120 are typically pillars raised above the nonmagnetic spaces 200 on the disk surface. The disks may be directly imprinted from the master mold. However, the more likely approach is to fabricate a master mold with a pattern of pillars corresponding to the pattern of islands desired for the disks and to use this master mold to fabricate replica molds. The replica molds will thus have a pattern of holes corresponding to the pattern of pillars on the master mold. The replica molds are then used to directly imprint the disks.

The master template or mold requires extensive time and effort to design. Additionally, it is fabricated by an expensive and time-consuming process using expensive equipment, for example by electron beam (e-beam) lithography. The master template (or replica molds made from the master template) is used for making millions of disks, each of which is an exact replica of the expensive master. It is possible that the master template or replica molds may be stolen, which would enable a potential competitor or media maker to create a new master with little investment in time or cost. Also, the master template or replica molds may be copied from a disk, for example by removing a disk from a disk drive, stripping the disk of its magnetic and planarizing material, and then using the patterned substrate as a replacement master template.

In this invention the master template has nondata regions that contain a pattern of one or more discrete nondata islands and discrete gaps, with this pattern representing a scrambled number. The pattern is scrambled using a cryptographic algorithm, meaning that it has been altered or modified using a secret code or key so as to be unintelligible to an unauthorized user who does not have the secret code or key. The cryptographic algorithm may be a block cipher with secret key or a cryptographic hash function with secret key, both of which generate pseudo-random numbers. All disks made from the mater template, or from replica molds made from the master, will have these same scrambled patterns. When the disks are DC-magnetized so that all the nondata islands are magnetized in the same direction, these patterns will include one or more of discrete magnetized nondata islands and discrete nonmagnetic gaps that represent the scrambled numbers. During operation of the disk drive the patterns are detected by the read head and descrambled within the disk drive, so that reading and writing of data can occur in the conventional manner.

Figure 4:
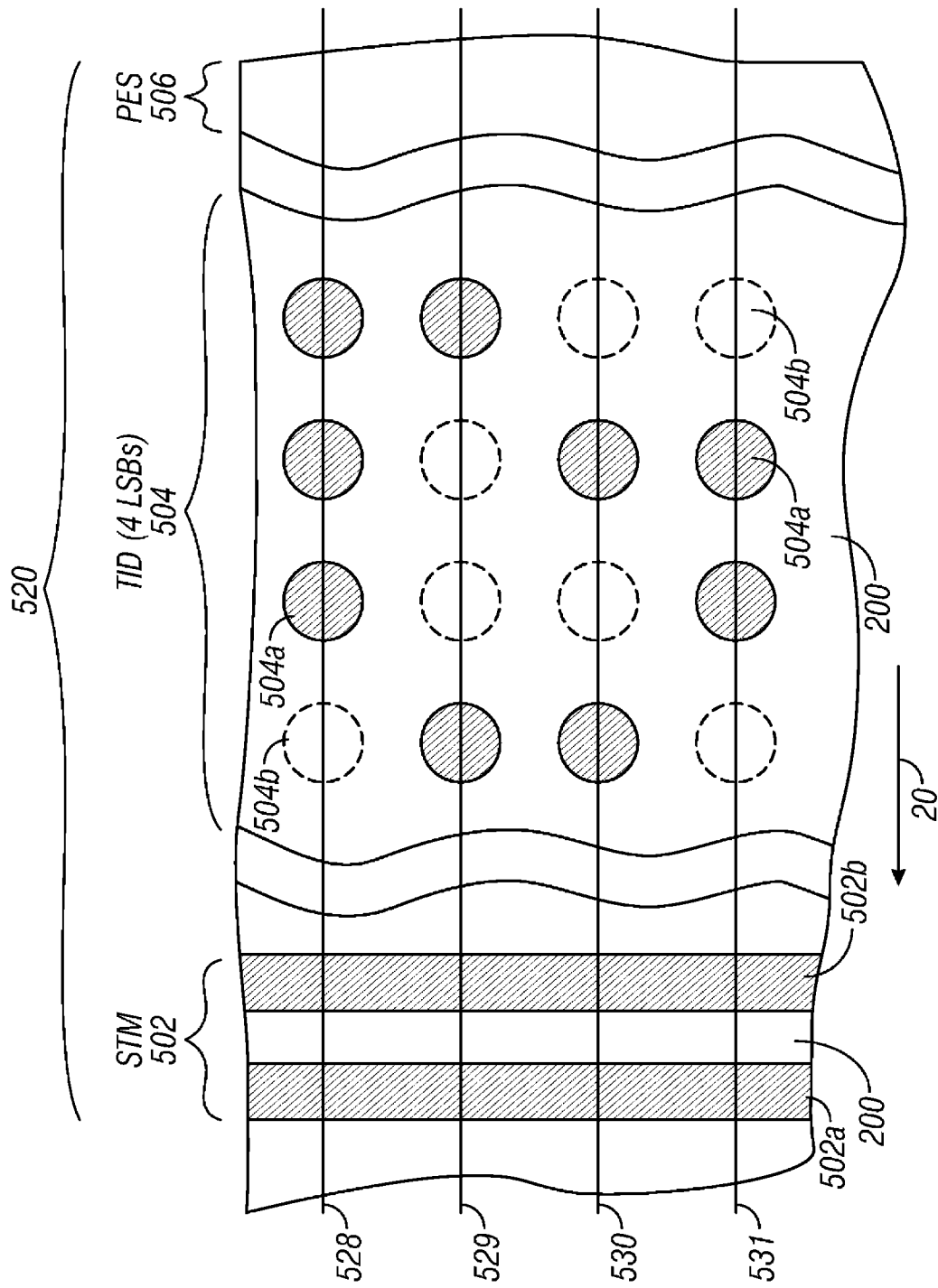
FIG. 4 is a portion of a patterned-media disk according to a first embodiment of the invention with scrambled track identification (TID) numbers.

FIG. 4 is a portion of a patterned-media disk according to a first embodiment of the invention. The disk is shown with a portion of a typical servo sector 520 spanning four data tracks with track centerlines 528-531. The servo sector includes STM field 502 with two stripes 502a, 502b extending across the tracks, TID field 502, only a portion of which is depicted, and PES field 506, only a portion of which is depicted. Each TID field typically includes an 18-bit number, but only four bits, for example the four least significant bits (LSBs) are shown. In a conventional patterned-media disk the TIDs would be numbered sequentially in the radial direction. Thus, for example, if the numbering was from top to bottom in FIG. 4 and the last digits of the TIDs were 0 to 4, then the four LSBs in tracks 528-531 would be 0000, 0001, 0011 and 0100. However, in this invention the TIDs are scrambled so the LSBs in FIG. 4 appear as "random" values. Each bit in the LSBs of the TID in FIG. 4 is either a nondata island 504a or a nonmagnetic gap 504b. All of the nondata islands 504a are magnetized in the same direction, so that "bits" in the LSBs are represented as either magnetized nondata islands 504a (for example, "ones") or the absence of magnetized islands (nonmagnetic gaps 504b or "zeros"). The nonmagnetic gaps 504b are represented as dashed circles to indicate that they are merely the absence of a nondata island. The portions of the disk between the nondata islands 504a and nonmagnetic gaps 504b, and between the STM marks 502a, 502b are nonmagnetic spaces 200 on the disk.

The scrambled TIDs are generated by applying a block cipher with secret key to the actual TID. A block cipher is a symmetric key cipher which operates on fixed-length groups of bits, termed blocks, with an unvarying transformation. When encrypting, a block cipher takes a block of plaintext as input, and outputs a corresponding block of ciphertext. This is the preferred scrambling method since the mapping should look random but it should be easy to perform the mapping and its inverse if a relatively short cryptographic key is known. For example, defining an arbitrary permutation on an 18-bit TID would take more than 4M bits but a pseudorandom mapping can be performed with a 128-bit key using a block cipher. The actual TIDs are input to the block cipher, using the secret key as an input, and the block cipher outputs the scrambled TIDs. For example, a typical patterned-media disk may include 500K tracks and thus 500K unique TIDs. These are converted into 500K scrambled TIDs by the block cipher. The scrambled TIDs are then used to create the pattern on the master template, with each track having a pattern of nondata islands and gaps corresponding to the scrambled TID. In FIG. 4, only the four LSBs of the scrambled TIDs are depicted. However, preferably all the bits of a TID are used so the entire TID is scrambled. Also, while FIG. 4 depicts each track having a scrambled TID, the invention is also applicable where less than all the tracks, for example each $10^{th}$ track, have their TIDs scrambled.

Referring back to FIG. 2, the patterned-media disk may optionally include physical sector numbers (PSNs) located as part of the sync field 173, or immediately preceding or immediately following the sync field 173. For example, if there are N servo sectors in one of the data zones, then there would be PSNs between 0 and N−1 in that particular zone. Thus, in a modification of the invention, the PSN and TID are combined and scrambled together. For example an 18-bit TID and a 7-bit PSN can be combined into a unified 25-bit number and jointly scrambled using a suitable block cipher. As a servo sector passes beneath the read head, the disk drive electronics receives the signal corresponding to the scrambled TID and PSN, and descrambles it, using the block and secret key, to recover the TID and PSN. When TIDs and PSNs are known, the disk drive read operates in the conventional manner.

Figure 5:
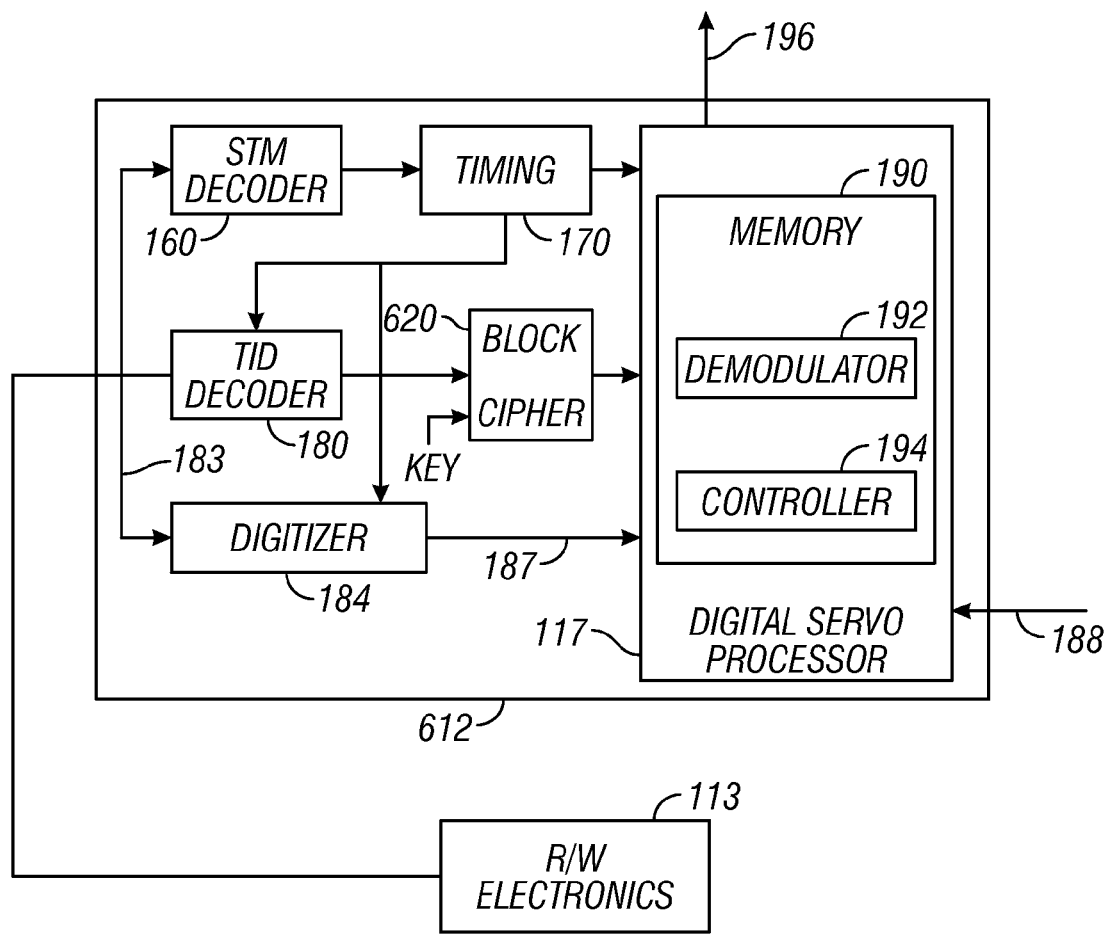
FIG. 5 is a block diagram of the servo electronics in the disk drive according to the invention that uses the patterned-media disk with scrambled TIDs according to the invention.

FIG. 5 is a block diagram of the servo electronics 612 in the disk drive that uses the patterned-media disk with scrambled TIDs according to the first embodiment of the invention, and shows the modification of the servo electronics in FIG. 3. After detection of an STM, the track identification (TID) decoder 180 receives timing information from timing circuit 170, reads the scrambled TID from R/W electronics 113, and then passes the decoded scrambled TID information to block cipher 620. Block cipher 620 takes as input the scrambled TID and the cryptographic key and outputs the descrambled TID. The descrambled TID is then input to servo control processor 117. The block cipher 620 may be an algorithm stored as executable computer program instructions in memory 190 of processor 117.

Figure 6:
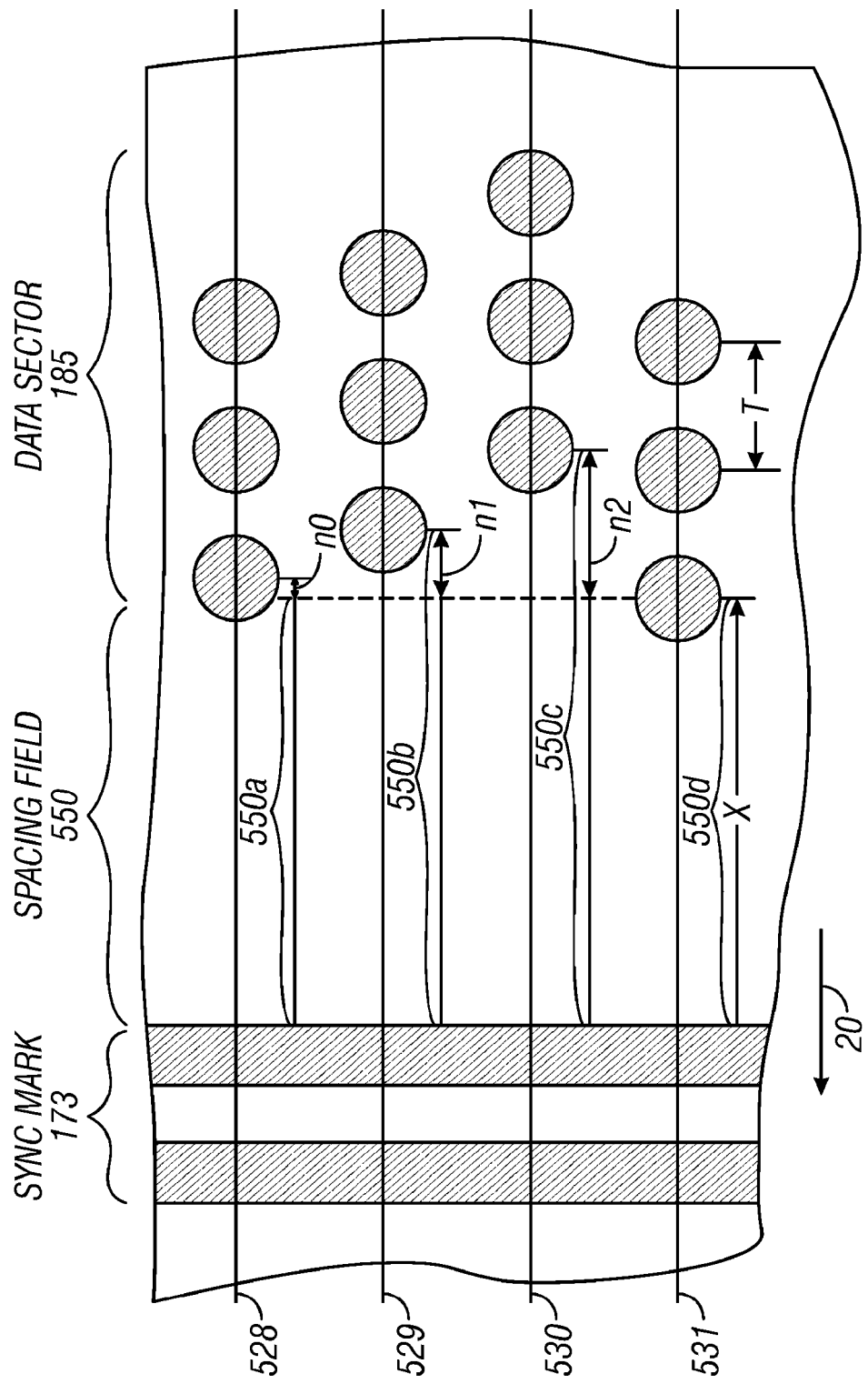
FIG. 6 is a schematic showing a portion of a patterned-media disk according to another embodiment of the invention with scrambled numbers representing phase shifts between data sectors in different tracks.

FIG. 6 is a portion of a patterned-media disk according to a second embodiment of the invention. The disk is shown with four data tracks with track centerlines 528-531, a sync mark 173 that extends across the data tracks, the beginning of a data sector 185, and a spacing field 550 between sync mark 173 and data sector 185. In this embodiment, there is not a fixed spacing between the sync mark 173 and the data sectors in the different data tracks. Instead, the positions of the start of islands in the data sectors are scrambled and the spacing between the sync mark 173 and the start of the data sector in each track may be different from that in other tracks. This is shown in FIG. 6 by spacings 550a-550d for tracks with centerlines 528-531, respectively. Each spacing for a track is an amount X plus a number "n" of nonmagnetic gaps. The number of nonmagnetic gaps are n0, n1, n2 and 0 for spacings 550a-550d, respectively. Thus, as can be appreciated from FIG. 6, the data sectors and thus the data islands in one track are phase shifted from the data sectors in other tracks based on the number "n" of nonmagnetic gaps in the tracks. The amount of the phase shift corresponds to the size of the spacing 550a-550d and represents a scrambled number. The number of nonmagnetic gaps (e.g., numbers n0, n1, n2, 0) in each track is a pseudo-random number that has been generated by applying a suitable scrambling function, such as a cryptographic hash function with a secret key, to the TID. Thus, as the disk rotates in the direction of arrow 20, the read head detects sync mark 173, but the data islands of the subsequent data sector can only be synchronized for reading or writing if the amount of the scrambled phase shift is known for each track.

The scrambled pattern in each track representing the spacings 550a-550d may be scrambled by use of the TIDs. The actual TIDs are input to a suitable function, such as a keyed hash function together with the cryptographic key. The outputs of the keyed hash function are, for example, 6-bit numbers representing the phase shifts. For example, a typical patterned-media disk may include 500K tracks and thus 5000K unique TIDs. The key-hashed TIDs are the numbers "n" that are used as the values of the scrambled phase shifts for the tracks. A 6-bit word will enable 64 different values of phase shift and 64 different values for the number "n". These scrambled numbers are then used to create the spacings on the master template, such as the spacings that would create spacings 550a-550d on the disks made from the master template. For example, each scrambled number "n" will have a value between 1 and 64 and this value is then added to the amount X. The phase shift numbers are preferably integer fractions of T, where T is the bit period, i.e., the spacing between two data islands. In the example of FIG. 6, each nonmagnetic gap corresponds to $1/64^{th}$ of a bit period T. For example, the data sector of track 529 is depicted as being phase shifted by T/2 from the data sector of track 531, so "n" in track 529 is 32 and the spacing 550b is X+32/64.

Figure 7:
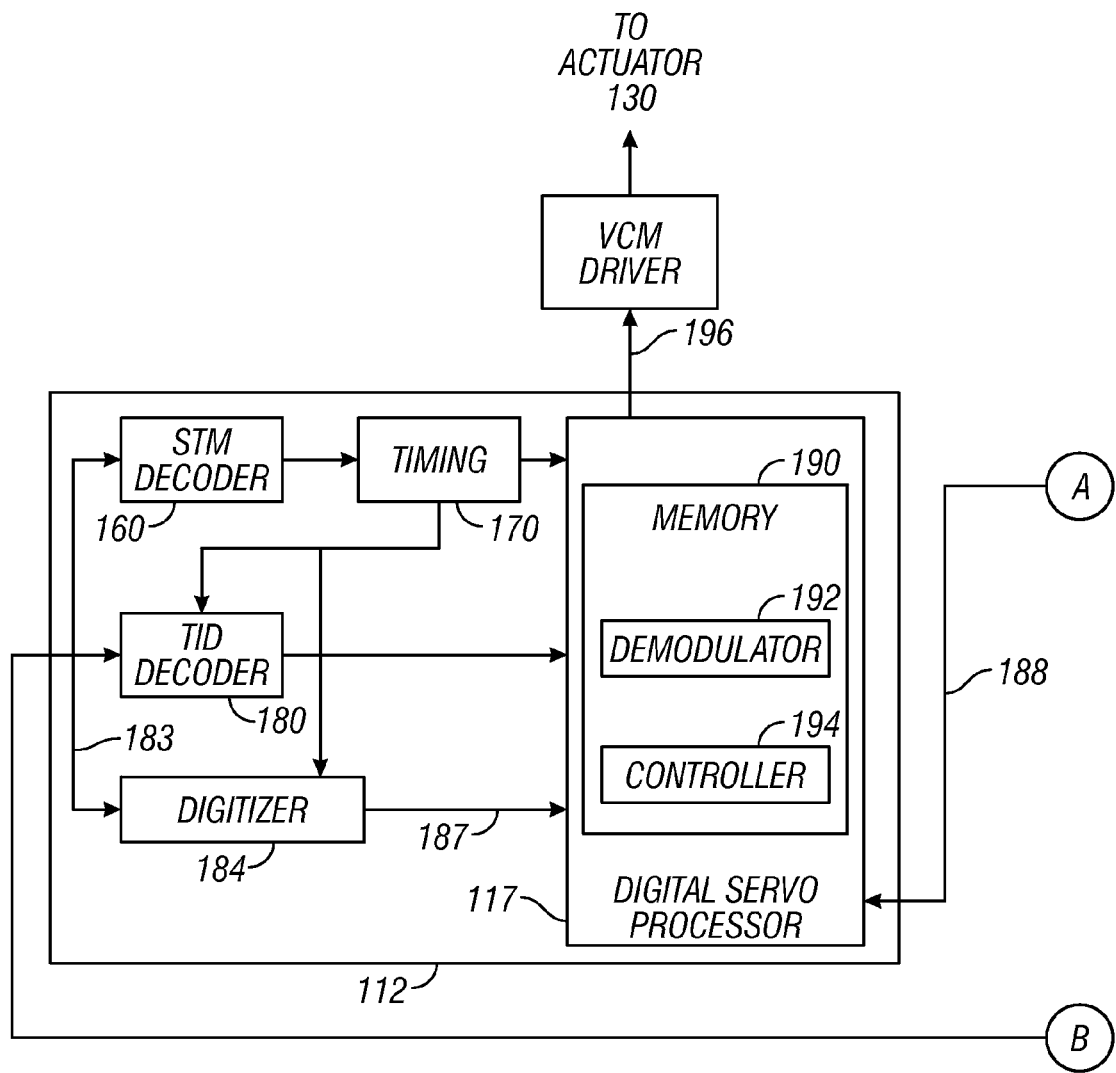
FIG. 7 is a block diagram of the electronics associated with the patterned-media disk drive according to the invention for use with the patterned-media disk with scrambled phase shift numbers according to the second embodiment of the invention.
Figure 7:
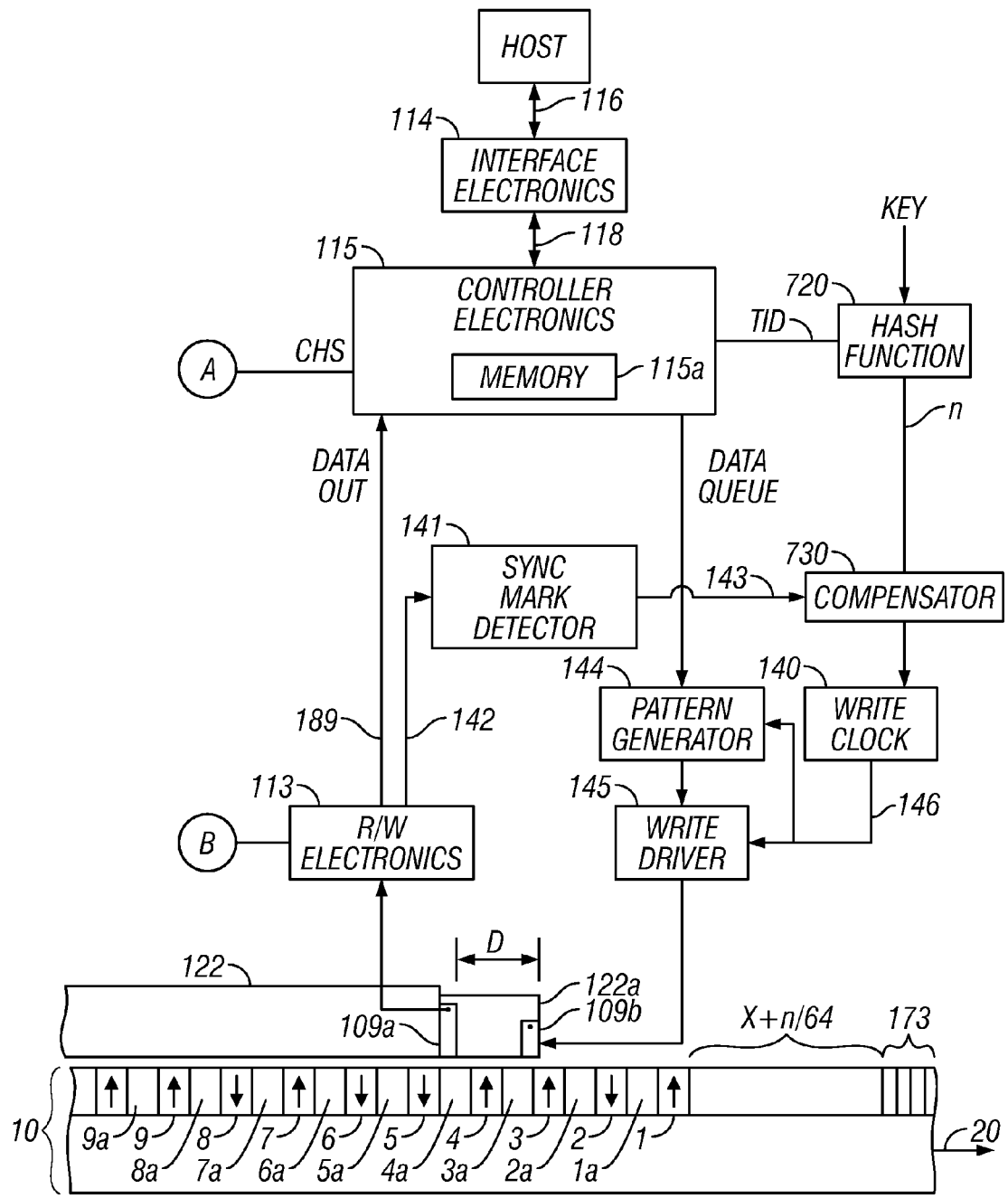

FIG. 7, which is not drawn to scale, is a block diagram of the disk drive electronics that uses the patterned-media disk with pseudo-random numbers representing phase shift values according to the second embodiment of the invention. The invention will be explained for an example where data is to be written to a specific data sector on the disk. As shown on disk 10', the spacing between sync mark 173 and the first data island 1 is a distance X+n/64, with the number "n" being a pseudo-random number generated from the TID by some suitable scrambling function and representing the number of nonmagnetic gaps added to X. Controller electronics 115 receives a list of requested data sectors from interface electronics 114 and converts each data sector request into a CHS number where the data is to be written. The CHS numbers are passed to servo electronics 112 on line 188 to enable the actuator 130 to position the read/write head 109 to the appropriate data sector. Controller electronics 115 also sends the actual TID (the cylinder or "C" portion of the CHS number) to the scrambling function, e.g., keyed hash function 720. The output of the keyed hash function 720 is the phase shift number "n". Thus, unlike the first embodiment where the scrambled TIDs are read from the disk and descrambled by the block cipher, in this embodiment the pseudo-random number "n" on the disk is not read and descrambled. Instead the hash function 720 uses the known TID and the cryptographic key to "generate" the value "n". The data to be written to the disk 10' is sent from the host to interface electronics 114 and controller electronics 115 and then as a data queue to pattern generator 144 and then to write driver 145. The write driver 145 generates high-frequency current pulses to the coil of write head 109b which results in the magnetic write fields that magnetize the data islands 1-9. The write clock 140 outputs a clock signal on line 146 to control the timing of pattern generator 144 and write driver 145. When the read head 109a detects a sync mark 173, a signal is sent through read/write electronics 113 to sync mark detector 141. Sync mark detector 141 then outputs a signal on line 143 to compensator 730. Compensator 730 also receives the output of hash function 720, which is the pseudo-random number "n". Compensator 730 then adjusts the phase of write clock by the number "n" of $1/64^{th}$ increments corresponding to the phase shift for the track containing the selected data sector. Thus the write clock 140 is correctly synchronized to control the timing of pattern generator 144 and write driver 145 so that the write pulses are sent to the data islands in the selected data sector to magnetize the data islands according to the desired data pattern. In FIG. 7, the hash function 720 that takes the actual TID and secret key to generate the pseudo-random number "n" may be an algorithm stored as executable computer program instructions in memory 115a of controller electronics 115.

The system and method as described above and illustrated with various block diagrams may be implemented in conventional analog or digital hardware components or in software. The servo control processor, the processor in the controller electronics, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned-media perpendicular magnetic recording disk comprising:

a plurality of generally concentric circular data tracks, each data track having data sectors and nondata regions, the data sectors containing discrete magnetizable data islands and at least one nondata region containing a pattern of one or more of discrete magnetized nondata islands and discrete nonmagnetic gaps, said pattern representing a scrambled number; and a plurality of angularly spaced synchronization marks extending generally radially across the tracks, each synchronization mark being associated with a data sector, and wherein the spacings between the synchronization marks and the associated data sectors in the tracks are nonmagnetic regions, wherein each spacing between a synchronization mark and its data sector in a track contains a pattern of nonmagnetic gaps representing a scrambled phase shift of the associated data sector in its track.

2. The disk of claim 1 wherein each scrambled phase shift represents a pseudo-random number generated from a hash function with secret key.

3. The disk of claim 1 wherein each of the plurality of tracks contains a multi-bit identification (TID) number and wherein the scrambled phase shift for a data sector in a track represents a pseudo-random number generated from a group of bits taken from said track's TID number.

4. A patterned-media magnetic recording disk drive having a magnetic recording disk, a read head, a write head, and an actuator connected to the read head and write head for moving the heads across the disk, the disk drive comprising:
- a patterned-media magnetic recording disk having a plurality of generally concentric circular data tracks, each data track containing a track identification (TID) number, discrete magnetizable data islands grouped into data sectors, and a plurality of magnetized nondata synchronization marks between the data sectors for synchronizing the writing of data in the data sectors, each synchronization mark being associated with a data sector, and wherein the spacing between a synchronization mark and its associated data sector in a track represents a scrambled phase shift number for the data sector;
- a data controller for selecting the data track and data sector where data is to be written;
- a read head for detecting the synchronization marks;
- a hash function having a secret key, the hash function providing a pseudo-random phase shift number for the data sector of the selected data track in response to the secret key and the TID of the selected data track;
- a write head for generating write pulses to magnetize the data islands in the data sectors;
- a write clock coupled to the write head for controlling the write pulses to the data islands; and
- a compensator for generating a phase adjustment signal to the write clock in response to the pseudo-random phase shift number from the hash function.

5. The disk drive of claim 4 wherein each TID number is a multi-bit number and wherein the hash function is responsive to a selected group of bits of the TID of the selected data track.

6. The disk drive of claim 4 wherein the data islands in the data sectors have a period T and wherein the pseudo-random phase shift numbers are integer fractions of T.

* * * * *